(12) United States Patent
Ogino et al.

(10) Patent No.: US 6,803,973 B2
(45) Date of Patent: Oct. 12, 2004

(54) SUBSTRATE FOR REFLECTION TYPE LIQUID CRYSTAL DISPLAY ELEMENT

(75) Inventors: Etsuo Ogino, Mie-gun (JP); Masahiro Ikadai, Mie-gun (JP)

(73) Assignee: Nippon Sheet Glass Co., Ltd. (JP)

( * ) Notice: Subject to any disclaimer, the term of this patent is extended or adjusted under 35 U.S.C. 154(b) by 134 days.

(21) Appl. No.: 09/876,179

(22) Filed: Jun. 7, 2001

(65) Prior Publication Data

US 2002/0071075 A1 Jun. 13, 2002

(30) Foreign Application Priority Data

| Jun. 7, 2000 | (JP) | 2000-170518 |
| Aug. 30, 2000 | (JP) | 2000-260501 |
| Apr. 9, 2001 | (JP) | 2001-110183 |

(51) Int. Cl.[7] ............................................. G02F 1/1347
(52) U.S. Cl. ........................... 349/30; 349/113; 349/114
(58) Field of Search ................................. 349/113, 114, 349/30

(56) References Cited

U.S. PATENT DOCUMENTS

| 5,882,774 A | * | 3/1999 | Jonza et al. ................ 428/212 |
| 6,262,842 B1 | * | 7/2001 | Ouderkirk et al. .......... 359/487 |
| 6,317,179 B1 | * | 11/2001 | Kamiya ...................... 349/78 |

* cited by examiner

*Primary Examiner*—Thanh Nguyen
(74) *Attorney, Agent, or Firm*—Rossi & Associates

(57) ABSTRACT

A substrate for reflection type liquid crystal display elements is provided, which has a multilayer dielectric film (reflective mirror) which can have fewer layers than according to the conventional art and can thus be formed in a shorter time, and which can stably obtain an optical characteristic of a desired flatness across the visible region, and moreover can prevent the occurrence of coloring due to reflection. The reflective mirror is formed on top of a transparent substrate, and is comprised of a predetermined number of high-refractive-index first transparent films and low-refractive-index second transparent films laminated alternately on the transparent substrate. Either or both of the first transparent films and the second transparent films are arranged such that the film thickness thereof increases progressively or decreases progressively with distance from the transparent substrate.

10 Claims, 14 Drawing Sheets

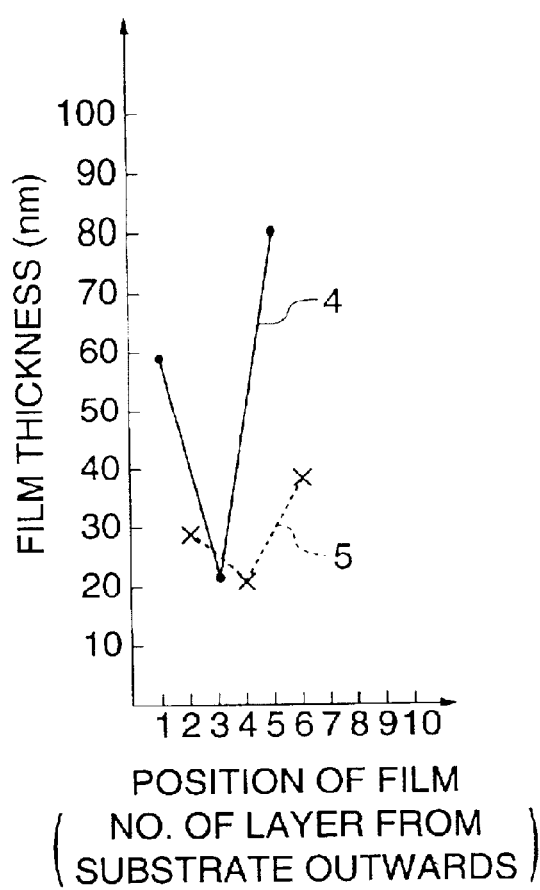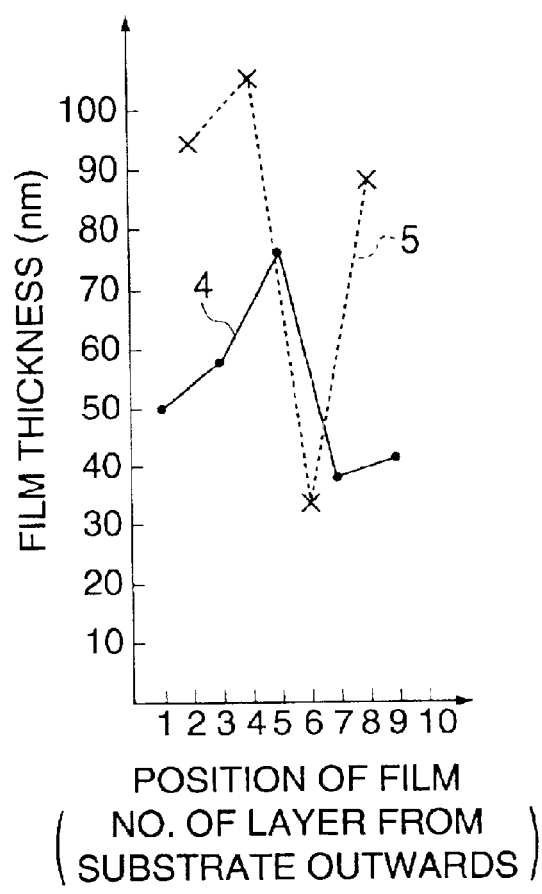

SUBSTRATE FOR REFLECTION TYPE LIQUID CRYSTAL DISPLAY ELEMENT

BACKGROUND OF THE INVENTION

1. Field of the Invention

The present invention relates to a substrate for reflection type liquid crystal display elements, and more particularly to a substrate for a reflection type liquid crystal display element that partially transmits light.

2. Related Background Art

In recent years, with an object of making portable electronic devices thinner and lighter, and also making prolonged operation with a battery as a power source possible, reflection type liquid crystal display elements that make use of external light and are characterized by having low power consumption have started to be used. One such reflection type liquid crystal display element that has been proposed is a semi-transmitting type liquid crystal display element that uses a semi-transmitting plate as a reflector plate, and can be used both as a reflection type liquid crystal display element in bright locations, and as a transmission type liquid crystal display element using a backlight in dark locations (see Japanese Laid-open Patent Publication (Kokai) No. 11-002709).

The liquid crystal display element substrate used in this semi-transmitting type liquid crystal display element has a constitution in which a liquid crystal layer is held between a pair of transparent substrates provided with liquid crystal driving electrodes, and the light scattering of the liquid crystal layer is controlled by means of the magnitude of a voltage applied across the liquid crystal layer. Moreover, a plurality of semi-transmitting reflector plates each formed of a thin film of a metal such as aluminum are laminated on the back side substrate. The thin metal film is made sufficiently thin as to partially transmit light.

Moreover, recently a substrate for a reflection type liquid crystal display element having, in place of thin metal films forming the semi-transmitting reflector plates, a multilayer dielectric film comprised of a predetermined number of transparent films laminated on top of one another, with these transparent films being formed of two dielectric materials having different refractive indexes to one another, has been proposed by the assignee of the present application (see Japanese Patent Application No. 2000-204952, which is an application claiming priority based on Japanese Patent Application No. 11-32689).

However, according to the above-mentioned reflection type liquid crystal display element having a multilayer dielectric film, there is a possibility of ripples occurring in the optical reflection spectrum or optical transmission spectrum across the visible region, resulting in a problem in which it is not always possible to stably obtain an optical characteristic of a desired flatness, and coloring due to reflected light occurs.

Moreover, by making the number of layers in the multi-layer dielectric film of the order of, for example, a few tens to a few hundreds, the degree of freedom to design the optical characteristic increases, with it being possible to set specifications such that the occurrence of ripples is suppressed, but there is a problem that as the number of layers is increased, the time taken to build up the layers increases to an industrially impractical extent.

SUMMARY OF THE INVENTION

It is an object of the present invention to provide a substrate for reflection type liquid crystal display elements having a multilayer dielectric film which can have fewer layers than according to the conventional art and can thus be formed in a shorter time, and which can stably obtain an optical characteristic of a desired flatness across the visible region, and moreover can prevent the occurrence of coloring due to reflection and transmission.

To attain the above object, the present invention provides a substrate for a reflection type liquid crystal display element, comprising a transparent substrate, and a reflective mirror formed on top of the transparent substrate, wherein the reflective mirror comprises a predetermined number of high-refractive-index first transparent films and low-refractive-index second transparent films laminated alternately on the transparent substrate, and wherein either or both of the first transparent films and the second transparent films are arranged such that a film thickness thereof increases progressively or decreases progressively with distance from the transparent substrate.

According to the above constitution, high-refractive-index transparent films and low-refractive-index transparent films are laminated alternately to form a multilayer dielectric film, and as a result the number of layers in the multilayer dielectric film can be made smaller, and hence the multilayer dielectric film can be made in a shorter time, the cost can be reduced, and mass production can be carried out more easily. Moreover, either or both of the high-refractive-index transparent films and the low-refractive-index transparent films are arranged such that the film thickness thereof increases progressively or decreases progressively with distance from the transparent substrate, and as a result an optical characteristic of a desired flatness across the visible region can be obtained stably, and the occurrence of coloring due to reflection can be prevented.

Preferably, the first transparent films are arranged such that a film thickness thereof increases progressively or decreases progressively with distance from the transparent substrate.

Preferably, the predetermined number is in a range of 3 to 14.

Preferably, the predetermined number is 3 or 4.

Preferably, each of the first transparent films has a refractive index of at least 1.8 at a wavelength of 550 nm, and each of the second transparent films is laminated on top of one of the first transparent films and has a refractive index of not more than 1.5 at the wavelength of 550nm. As a result, the efficiency with which light is used can be improved, and moreover, since thin metal films are not used in any of the transparent films, with regard to the signals inputted into the transparent conductive films, the possibility of signal delay being caused can be eliminated.

Preferably, the first transparent films are formed of a high-refractive-index material having titanium dioxide as a principal component, and the second transparent films are formed of a low-refractive-index material having silicon dioxide as a principal component. As a result, the difference in refractive index between the high-refractive-index transparent films and the low-refractive-index transparent films can be increased, and an optical characteristic of a desired flatness can be obtained with greater certainty.

Preferably, the substrate for a reflection type liquid crystal display element further comprises a base film having silicon dioxide as a principal component laminated on top of the transparent substrate. As a result, the adhesion between the transparent substrate and the transparent film closest to the transparent substrate is improved, impurities leaching out of the transparent substrate are intercepted, and hence an alkali passivation effect can be obtained.

More preferably, one of the first transparent films furthest from the transparent substrate is a photocatalytically active film having titanium dioxide as a principal component. As a result, dirt can be removed easily from the reflective mirror and hence the reflective mirror can be kept clean, and moreover adhesion to a color filter can be improved.

Preferably, the substrate for a reflection type liquid crystal display element further comprises a hydrophilic thin film having silicon dioxide as a principal component laminated on top of the one of the first transparent films. As a result, the hydrophobicity is mitigated and cleaning with an aqueous cleaning solution can be made effective.

More preferably, the substrate for a reflection type liquid crystal display element further comprises a transparent rugged scattering layer laminated between the transparent substrate and the base film. As a result, reflected light in the substrate is scattered to obtain a uniform intensity of reflection over a specific range of angle of visibility.

The above and other objects, features and advantages of the invention will become more apparent from the following detailed description taken in conjunction with the accompanying drawings.

BRIEF DESCRIPTION OF THE DRAWINGS

FIG. 1A shows a representative substrate for a reflection type liquid crystal display element;

FIG. 1B shows an applied example of a substrate for a reflection type liquid crystal display element;

FIG. 4A shows the case for Example 5;

FIG. 4B shows the case for Example 13;

FIG. 5A shows the case for Example 6;

FIG. 5B shows the case for Example 14;

FIGS. 6A and 6B are graphs showing the film thicknesses of the high-refractive-index transparent films 4 and the low-refractive-index transparent films 5 in the Comparative Examples shown in Table 2; specifically:

FIG. 6A shows the case for Comparative Example 1;

FIG. 6B shows the case for Comparative Example 2;

DETAILED DESCRIPTION OF PREFERRED EMBODIMENTS

A description of embodiments of the present invention will now be given with reference to the drawings.

The present inventors conducted assiduous studies to attain the above object, and as a result discovered that, in a substrate for a reflection type liquid crystal display element comprised of a reflective mirror formed on top of a transparent substrate, wherein the reflective mirror is comprised of a predetermined number of high-refractive-index transparent films (first transparent films) and low-refractive-index transparent films (second transparent films) laminated alternately on the transparent substrate, if either or both of the high-refractive-index transparent films and the low-refractive-index transparent films are arranged such that the film thickness thereof increases progressively or decreases progressively with distance from the transparent substrate, then the difference between the maximum light reflectance and the minimum light reflectance within the visible region (400 to 700 nm) becomes small, and hence it becomes possible to stably obtain an optical characteristic of a desired flatness across the visible region, and to prevent the occurrence of coloring due to reflection and transmission.

The present invention was achieved based on the above findings.

A description will now be given of substrates for reflection type liquid crystal display elements according to embodiments of the present invention with reference to FIGS. 1A and 1B.

Figure 1A:
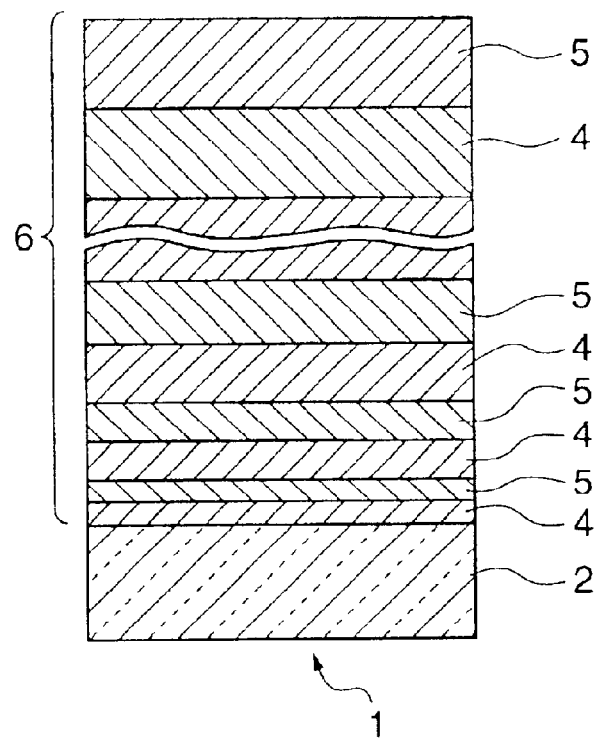
FIGS. 1A and 1B are sectional views showing the schematic structures of substrates for reflection type liquid crystal display elements according to embodiments of the present invention; specifically.
Figure 1B:
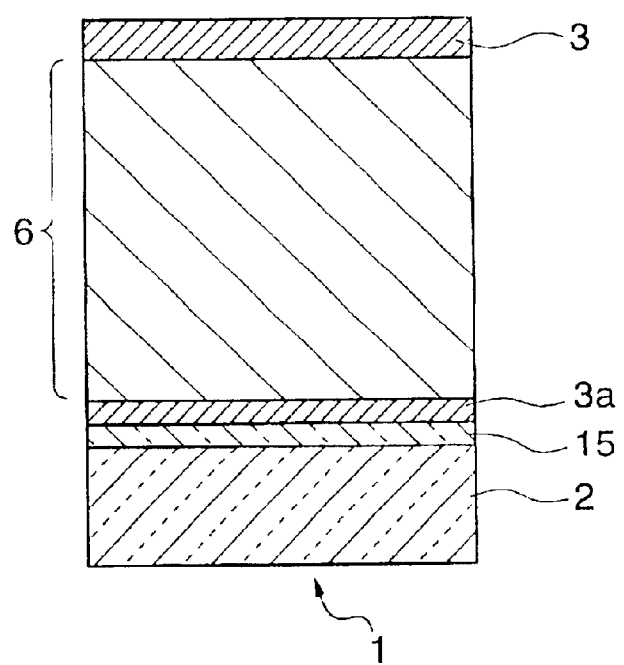

FIGS. 1A and 1B are sectional views showing the schematic structures of substrates for reflection type liquid crystal display elements according to embodiments of the present invention. FIG. 1A shows a representative example, whereas FIG. 1B shows an applied example thereof.

According to the reflection type liquid crystal display element substrate 1 in FIG. 1A, a predetermined number m (where m is a positive integer) of high-refractive-index transparent films 4 (first transparent films) formed of a high-refractive-index material that is a dielectric exhibiting low light absorption and low-refractive-index transparent films 5 (second transparent films) formed of a low-refractive-index material that is a dielectric exhibiting low light absorption are laminated alternately on a transparent substrate 2.

A silicate glass having a refractive index of about 1.50 to 1.55 at a wavelength of 550 nm is generally used for the transparent substrate 2, with particular examples being a soda lime silicate glass, an alkali-free glass (for example NA35 glass made by NH Techno Glass Corp. or AN635 glass made by ASAHI GLASS CO., LTD.) or a low-alkali glass, but there is no such limitation and a transparent plastic or the like may also be used.

A multilayer dielectric film reflective mirror 6 is formed on the transparent substrate 2 by alternately laminating high-refractive-index transparent films 4 and low-refractive-index transparent films 5, with the total number of transparent films 4 and 5 being m. This multilayer dielectric film reflective mirror 6 acts as a reflective film that reflects light. By appropriately setting the thicknesses of the high-refractive-index transparent films 4 and the low-refractive-index transparent films 5 and the predetermined number m, the optical transmittance and the light reflectance can be set to desired values.

The transparent films 4 and 5 of the multilayer dielectric film reflective mirror 6 are arranged such that the film thicknesses thereof increase progressively with distance from the transparent substrate 2. Moreover, as an alternative, it is also possible for the transparent films 4 and 5 to be arranged such that the film thicknesses thereof decrease progressively with distance from the transparent substrate 2, or for the high-refractive-index transparent films 4 only to be arranged such that the film thickness thereof increases progressively with distance from the transparent substrate 2, or for the high-refractive-index transparent films 4 only to be arranged such that the film thickness thereof decreases progressively with distance from the transparent substrate 2. By arranging the transparent films 4 and 5 in this way, the difference between the maximum and minimum values of the light reflectance and light transmittance across the visible region (400 to 700 nm) becomes small, and it becomes possible to achieve an optical characteristic of a desired flatness, and to prevent coloring due to reflection and transmission. In consideration of the effect of the multilayer dielectric film reflective mirror 6 in preventing coloring due to reflection and transmission, and also to reduce the time required for the building up of the layers and hence make mass production easier, it is preferable for the predetermined number m to be in the range of 3 to 14.

For the above reasons, the total number m of high-refractive-index transparent films 4 and low-refractive-index transparent films 5 laminated is preferably 3 to 14, but to make the light reflectance curve yet flatter and further improve the coloring prevention effect it is preferable for m to be at least 6, and to make mass production easier it is preferable for m to be not more than 12. Moreover, if it is important to further reduce the time required for the building up of the layers and hence make mass production yet easier, then m is preferably 3 or 4.

The above-mentioned optical transmittance and light reflectance are set in accordance with the required design specifications (which depend on the use etc.) of the substrate for a reflection type liquid crystal display element. For example, the light reflectance is set in the range of 5 to 95%; if the liquid crystal display element is to be used as a reflection type liquid crystal display element in a relatively bright environment, then the light reflectance is set to a high value (65 to 95%), whereas if the liquid crystal display element is to be used as a transmission type liquid crystal display element in a relatively dark environment, then the light reflectance is set to a low value (5 to 45%). If the light reflectance is set in the range of 45 to 65%, then a liquid crystal display element suitable for use both as a reflection type and a transmission type can be manufactured.

The larger the difference in refractive index between the high-refractive-index transparent films 4 and the low-refractive-index transparent films 5 the better. A dielectric material exhibiting low light absorption and having a refractive index of at least 1.8 is preferable as the high-refractive-index material used in the high-refractive-index transparent films 4. Specifically, titanium dioxide ($TiO_2$), zirconium dioxide, tantalum oxide, hafnium oxide and the like can be used, but out of these titanium dioxide is most preferable. Note that, to reduce strain that is generated when the multilayer film is formed and improve chemical durability, it is also possible to use titanium dioxide as the principal component but also include small quantities of one or more of the above-mentioned other dielectric materials.

A dielectric material exhibiting low light absorption and having a refractive index of not more than 1.5 is preferable as the low-refractive-index material used in the low-refractive-index transparent films 5. Specifically, silicon dioxide ($SiO_2$) is used, but to reduce strain that is generated when the multilayer film is formed and improve chemical durability, it is also possible to use silicon dioxide as the principal component but also include small quantities of aluminum oxide or the like.

The high-refractive-index transparent film 4 furthest from the transparent substrate 2 is preferably a photocatalytically active film having titanium dioxide as the principal component; this high-refractive-index transparent film 4 acts as a photocatalytic film. Titanium dioxide generally exhibits a dirt-removing effect in which organic matter is decomposed (by oxidation) through the photocatalytic action of the titanium dioxide. As a result of the above, even if a low-refractive-index transparent film 5 is laminated as the outermost layer of the multilayer dielectric film reflective mirror 6, during the manufacturing of the substrate for a reflection type liquid crystal display element, before a color filter 8 (see FIG. 2) is laminated on top of the multilayer dielectric film reflective mirror 6, irradiation with ultraviolet rays can be carried out, thus easily removing dirt from the multilayer dielectric film reflective mirror 6 and keeping the multilayer dielectric film reflective mirror 6 clean, and also improving adhesion to the color filter 8. Note that, in addition to the principal component titanium dioxide, materials such as iron, niobium and aluminum may also be included as secondary components.

Moreover, as shown in FIG. 1B, it is further preferable for a hydrophilic thin film 3 having silicon dioxide as the principal component to be laminated on top of the outermost layer of the multilayer dielectric film reflective mirror 6. Even if the The outermost high-refractive-index transparent film 4, as well as exhibiting a photocatalytic action as described above, also exhibits a property of repelling water (hydrophobicity), and hence if this high-refractive-index transparent film 4 is laminated as the outermost layer of the multilayer dielectric film reflective mirror 6, then there is a drawback in that when the surface of the multilayer dielectric film reflective mirror 6 is contaminated with organic substances in the air, cleaning with an aqueous cleaning solution becomes difficult. It is thus possible to mitigate this hydrophobicity by laminating the hydrophilic thin film 3 on top of the outermost high-refractive-index transparent film 4, thus ensuring that cleaning with an aqueous cleaning solution will be effective. To ensure that the photocatalytic action of the high-refractive-index transparent film 4 laminated immediately below the hydrophilic thin film 3 is not lost, the hydrophilic thin film 3 preferably has a thickness of not more than 10 nm.

A base film 3a having silicon dioxide as the principal component may also be laminated on top of the transparent substrate 2, and in addition a transparent rugged scattering layer 15 composed principally of a thermosetting resin such as an acrylic resin, a polyimide resin, an epoxy resin or the like may also be laminated between the transparent substrate 2 and the base film 3a. The base film 3a improves the adhesion between the transparent substrate 2 or the transparent rugged scattering layer 15 and the innermost high-refractive-index transparent film 4, and also, in the case that soda lime silicate glass is used for the transparent substrate 2, prevents contamination from sodium ions leaching out of the transparent substrate 2. Moreover, if a transparent plastic substrate is used as the transparent substrate 2, then there is a possibility of water leaching out of the transparent substrate 2, in which case it is preferable for the base film 3a to be used laminated on top of a hard coating formed of a polyorganosiloxane.

The transparent rugged scattering layer 15 has minute irregularities formed on the surface thereof, and by means of these irregularities reflected light in the substrate is scattered to obtain a uniform intensity of reflection over a specific range of angle of visibility. The refractive index of the transparent rugged scattering layer 15 is preferably about the same as that of the transparent substrate 2.

Figure 2:
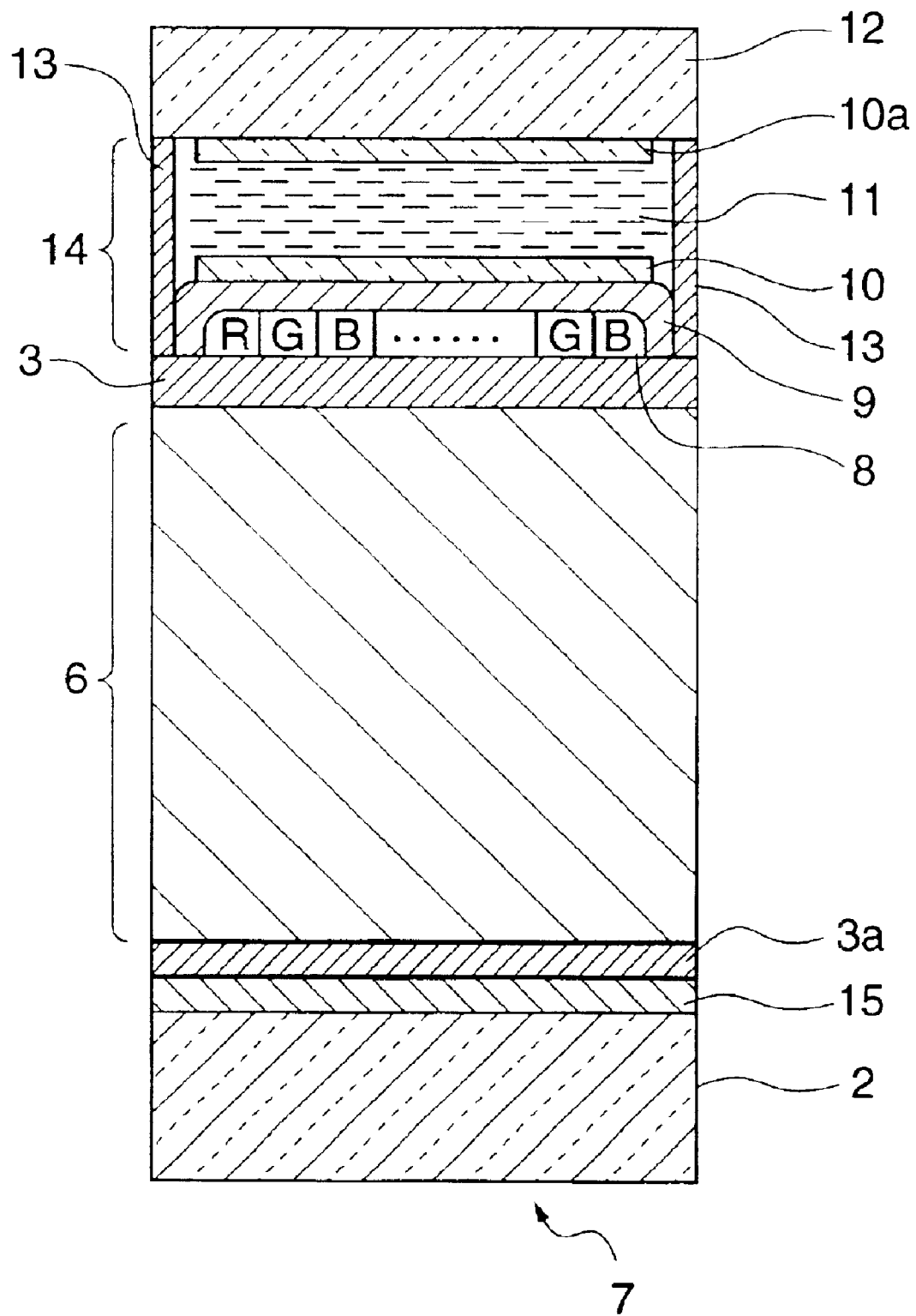
FIG. 2 is a sectional view showing the schematic structure of an example of a color liquid crystal display element manufactured using the reflection type liquid crystal display element substrate 1.

FIG. 2 is a schematic sectional view showing the structure of an example of a color liquid crystal display element manufactured using the reflection type liquid crystal display element substrate 1 of FIG. 1B.

In FIG. 2, the color filter 8 comprised of red, green and blue cells arranged in a mosaic is laminated on top of the multilayer dielectric film reflective mirror 6. An overcoat 9 for protecting the color filter 8 is laminated on top of the color filter 8, and a transparent conductive film 10 formed of ITO or the like is laminated on top of the overcoat 9. A glass faceplate 12 is provided as the outermost layer furthest from the transparent substrate 2, and a transparent conductive film 10a formed of ITO or the like is laminated on the inside of the glass faceplate 12. A liquid crystal layer 11 is held between the transparent conductive film 10 and the transparent conductive film 10a. Moreover, a sealant 13 is provided around the periphery of the liquid crystal layer 11 so that the liquid crystals will not leak out. Note that, in the present embodiment, when investigating what values to use for the number of high-refractive-index transparent films 4 and low-refractive-index transparent films 5 in the multilayer dielectric film reflective mirror 6 and the film thicknesses thereof, in place of the laminate consisting of the color filter 8, the overcoat 9, the transparent conductive films 10 and 10a, the liquid crystal layer 11 and the sealant 13, a suppositious layer (matching layer 14) optically equivalent to this laminate was used. The refractive index of this matching layer 14 takes a value anywhere in the range of 1.50 to 1.55 depending on the types of the overcoat 9, the liquid crystal layer 11 and the like, but for the present embodiment the appropriate value was calculated to be 1.52.

Methods primarily used for forming the high-refractive-index transparent films 4 and the low-refractive-index transparent films 5 include a known vapor deposition method, a known ion plating method and a known sputtering method, but other methods may also be used. When forming the high-refractive-index transparent films 4 and the low-refractive-index transparent films 5 using a vapor deposition method, quartz glass pellets, a titanium dioxide sintered boy and a zirconium dioxide sintered body are used as the deposition materials, and the vapor deposition is carried out while feeding in a moderate amount of oxygen from the outside. When a sputtering method is used, radio frequency sputtering is carried out with quartz glass as the target, or titanium metal is reacted with oxygen and sputtering is carried out.

Figure 3:
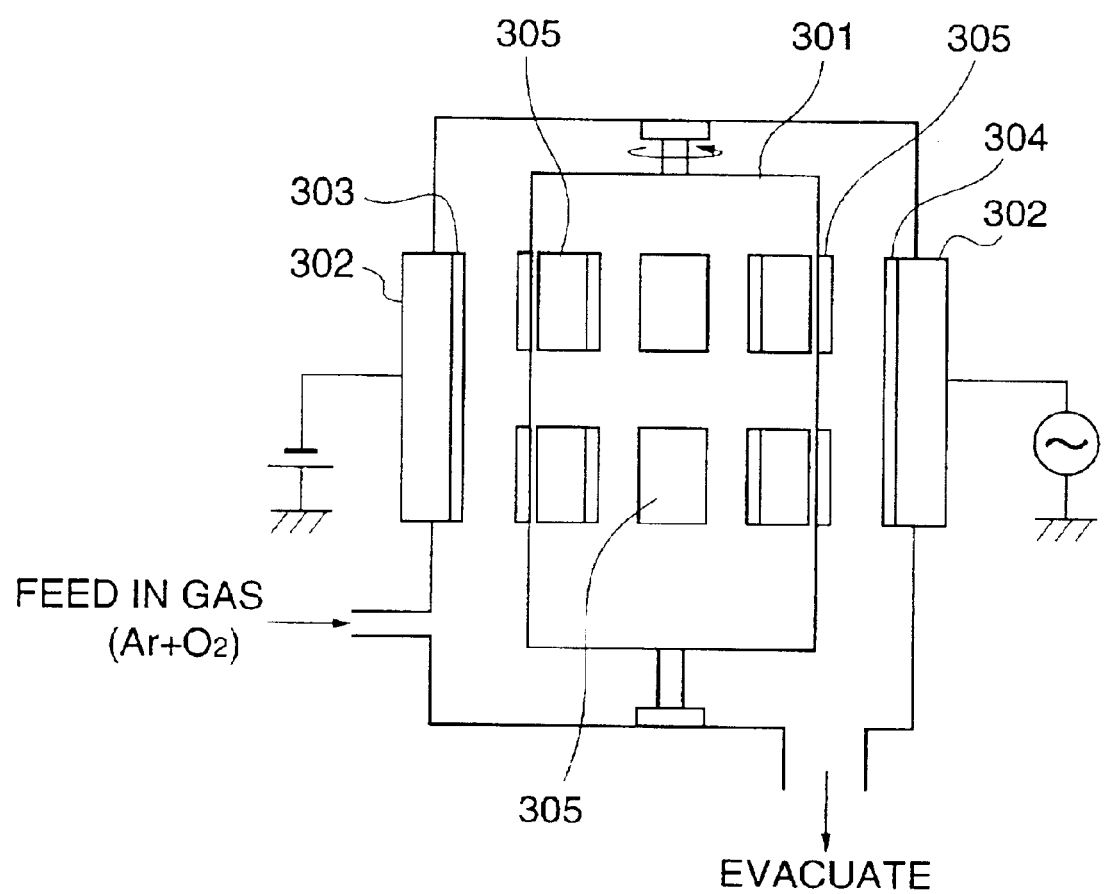
FIG. 3 is a schematic view showing the structure of an example of a manufacturing device for manufacturing a substrate for a reflection type liquid crystal display element.

FIG. 3 is a schematic view showing the structure of an example of a manufacturing device for manufacturing the reflection type liquid crystal display element substrate of FIG. 1B.

The manufacturing device shown in FIG. 3 is a cylindrical type sputtering film-forming device. A titanium metal target 303 is stuck onto one cathode 302, and a quartz glass target 304 is stuck onto another cathode 302. A plurality of glass substrates 305, which are transparent substrates 2 as described above, are stuck onto the peripheral surface of a cylindrical substrate holder 301 having a rotating shaft. By rotating the substrate holder 301, a multilayer dielectric film reflective mirror 6 is deposited onto each glass substrate 305. Specifically, when a glass substrate 305 passes in front of the surface of the titanium metal target 303, a titanium dioxide film is formed as a high-refractive-index transparent film 4, and when the glass substrate 305 passes in front of the surface of the quartz glass target 304, a silicon dioxide film is deposited as either a low-refractive-index transparent film 5 or the hydrophilic thin film 3. By applying electrical power to the titanium metal target 303 and the quartz glass target 304 alternately, titanium dioxide films and silicon dioxide films are laminated alternately.

For the titanium dioxide film deposition, a direct current reactive sputtering method is used in a 50 vol %-oxygen 50 vol %-argon atmosphere at a total pressure of 0.4 Pa. The total pressure may be varied within the range of 0.1 to 1 Pa. The oxygen percentage is set as appropriate such that the titanium dioxide film obtained will not greatly absorb light. For the silicon dioxide film deposition, a radio frequency sputtering method is used in an argon atmosphere at a total pressure of 0.4 Pa.

The glass substrates 305 do not have to be heated during the deposition of the high-refractive-index transparent films 4 and low-refractive-index transparent films 5, but may be heated to about 400° C. if made of a glass that does not degrade upon heating such as a silicate glass. Moreover, the degree of photocatalytic activity of the outermost high-refractive-index transparent film 4 can be improved by heating, and to raise the degree of photocatalytic activity to a practically useful level (i.e. a level such that dirtiness is prevented), it is preferable to deposit the outermost high-refractive-index transparent film 4 to a thickness of at least 10 nm, more preferably at least 20 nm.

EXAMPLES

A description will now be given of examples of the present invention.

First, a multilayer dielectric film reflective mirror 6 was formed on a glass transparent substrate 2 (refractive index 1.52) manufactured using soda lime glass materials (primarily 72 mass % SiO$_2$, 13 mass % Na$_2$O, 8 mass % CaO, 1.8 mass % Al$_2$O$_3$, 0.9 mass % K$_2$O), with the multilayer dielectric film reflective mirror 6 being formed by depositing high-refractive-index transparent films 4 and low-refractive-index transparent films 5 using the manufacturing device described above under the film deposition conditions described above, that is a 50 vol %-oxygen 50 vol %-argon atmosphere at a total pressure of 0.4 Pa for the titanium dioxide (TiO$_2$) films and an argon atmosphere at a total pressure of 0.4 Pa for the silicon dioxide (SiO$_2$) films, and with the number of layers deposited and the thicknesses thereof being as shown in Tables 1 and 2. In this way, samples shown in Tables 1 and 2 (Examples 1 to 30 and Comparative Examples 1 and 2) were prepared.

Note that, in the present embodiment, the samples shown in Tables 1 and 2 were suppositions optical multilayered bodies formed using a matching layer 14 (refractive index 1.52) in place of the laminate consisting of a color filter 8, an overcoat 9, transparent conductive films 10 and 10*a*, a liquid crystal layer 11 and a sealant 13 that should be laminated on top of the multilayer dielectric film reflective mirror 6, wherein the matching layer 14 was optically equivalent to this laminate, and then a glass faceplate 12 (refractive index 1.50) laminated on top of the matching layer 14. The suppositions optical multilayered bodies formed in this way were approximately equivalent to the corresponding actual reflection type liquid crystal display elements.

TABLE 1

| | | NO. OF LAYERS (m) | BASE FILM SiO$_2$ | LAYER 1 TiO$_2$ | LAYER 2 SiO$_2$ | LAYER 3 TiO$_2$ | LAYER 4 SiO$_2$ | LAYER 5 TiO$_2$ | LAYER 6 SiO$_2$ | LAYER 7 TiO$_2$ |
|---|---|---|---|---|---|---|---|---|---|---|
| | | | | FILM MATERIAL/THICKNESS (UNIT: nm) | | | | | | |
| EXAMPLE | 1 | 5 | | 16.4 | 34.5 | 61.4 | 37.1 | 81.0 | | |
| | 2 | 6 | | 80.5 | 38.7 | 58.7 | 29.5 | 22.3 | 21.1 | |
| | 3 | | | 11.4 | 64.1 | 23.7 | 116.7 | 63.7 | 159.2 | |
| | 4 | | | 61.0 | 115.0 | 25.3 | 50.4 | 16.4 | 6.3 | |
| | 5 | | | 16.3 | 39.5 | 53.9 | 93.4 | 64.2 | 141.1 | |
| | 6 | | | 60.0 | 87.8 | 55.4 | 26.6 | 20.2 | 20.0 | |
| | 7 | 10 | | 42.3 | 41.4 | 53.8 | 69.6 | 60.5 | 105.0 | 70.1 |
| | 8 | | | 77.9 | 97.3 | 71.3 | 74.8 | 63.2 | 62.9 | 43.3 |
| | 9 | 12 | | 39.9 | 53.8 | 51.9 | 56.7 | 69.9 | 57.1 | 84.2 |
| | 10 | | | 89.3 | 121.8 | 85.0 | 90.6 | 83.9 | 84.6 | 64.8 |
| | 11 | 14 | | 41.1 | 63.0 | 48.9 | 73.7 | 55.2 | 77.6 | 66.5 |
| | 12 | | | 87.4 | 124.7 | 73.2 | 115.3 | 68.8 | 104.7 | 62.8 |
| | 13 | 9 | | 38.3 | 38.8 | 58.3 | 65.7 | 60.1 | 95.9 | 72.3 |
| | 14 | | | 77.1 | 99.2 | 69.0 | 83.9 | 60.9 | 56.4 | 47.1 |
| | 15 | | | 38.9 | 34.7 | 40.7 | 88.2 | 50.1 | 94.2 | 57.9 |
| | 16 | | | 79.7 | 105.6 | 59.2 | 95.2 | 50.3 | 87.6 | 41.2 |
| | 17 | 6 | 10.0 | 80.5 | 38.7 | 58.7 | 29.5 | 22.3 | 21.1 | |
| | 18 | 10 | 10.0 | 42.3 | 41.4 | 53.8 | 69.6 | 60.5 | 105.0 | 70.1 |
| | 19 | 9 | | 38.3 | 38.8 | 58.3 | 65.7 | 60.1 | 95.9 | 72.3 |
| | 20 | | | 38.3 | 38.8 | 58.3 | 65.7 | 60.1 | 95.9 | 72.3 |

| | | NO. OF LAYERS (m) | LAYER 8 SiO$_2$ | LAYER 9 TiO$_2$ | LAYER 10 SiO$_2$ | LAYER 11 TiO$_2$ | LAYER 12 SiO$_2$ | LAYER 13 TiO$_2$ | LAYER 14 SiO$_2$ | HYDROPHILIC FILM SiO$_2$ |
|---|---|---|---|---|---|---|---|---|---|---|
| | | | FILM MATERIAL/THICKNESS (UNIT: nm) | | | | | | | |
| EXAMPLE | 1 | 5 | | | | | | | | |
| | 2 | 6 | | | | | | | | |
| | 3 | | | | | | | | | |
| | 4 | | | | | | | | | |
| | 5 | | | | | | | | | |
| | 6 | | | | | | | | | |
| | 7 | 10 | 117.4 | 80.8 | 159.1 | | | | | |
| | 8 | | 41.4 | 39.8 | 21.0 | | | | | |
| | 9 | 12 | 81.0 | 85.6 | 87.0 | 91.5 | 89.9 | | | |
| | 10 | | 55.6 | 64.1 | 52.8 | 48.3 | 36.6 | | | |
| | 11 | 14 | 101.9 | 72.1 | 108.0 | 77.9 | 117.1 | 88.3 | 132.4 | |
| | 12 | | 92.7 | 47.1 | 80.9 | 44.9 | 69.8 | 39.2 | 37.1 | |
| | 13 | 9 | 113.4 | 82.1 | | | | | | |
| | 14 | | 39.3 | 39.4 | | | | | | |
| | 15 | | 106.7 | 75.5 | | | | | | |
| | 16 | | 38.5 | 37.0 | | | | | | |
| | 17 | 6 | | | | | | | | |
| | 18 | 10 | 117.4 | 80.8 | 159.1 | | | | | |
| | 19 | 9 | 113.4 | 82.1 | | | | | | 3.0 |
| | 20 | | 113.4 | 82.1 | | | | | | 8.0 |

<SUBSTRATE SIDE>←                    →<OUTSIDE>

TABLE 2

| | | NO. OF LAYERS (m) | BASE FILM SiO$_2$ | LAYER 1 TiO$_2$ | LAYER 2 SiO$_2$ | LAYER 3 TiO$_2$ | LAYER 4 SiO$_2$ | LAYER 5 TiO$_2$ | LAYER 6 SiO$_2$ | LAYER 7 TiO$_2$ |
|---|---|---|---|---|---|---|---|---|---|---|
| | | | | FILM MATERIAL/THICKNESS (UNIT: nm) | | | | | | |
| EXAMPLE | 21 | 10 | | 34.9 | 47.8 | 39.1 | 79.1 | 49.9 | 100.2 | 69.5 |
| | 22 | | | 86.0 | 89.9 | 72.9 | 85.0 | 50.1 | 100.1 | 40.0 |
| | 23 | 12 | | 33.6 | 66.5 | 48.4 | 53.8 | 71.4 | 60.3 | 80.9 |
| | 24 | | | 90.9 | 123.5 | 85.1 | 95.6 | 82.7 | 100.0 | 66.9 |
| | 25 | 14 | | 36.0 | 71.5 | 50.0 | 73.7 | 53.1 | 74.5 | 66.3 |
| | 26 | | | 87.2 | 123.9 | 77.1 | 104.6 | 70.0 | 112.5 | 64.9 |

TABLE 2-continued

|  |  | No. of layers | | | | | | | |
|---|---|---|---|---|---|---|---|---|---|
|  | 27 | 3 | 10.0 | 10.1 | 64.4 | 75.8 | | | |
|  | 28 |  | 10.0 | 68.9 | 42.1 | 10.2 | | | |
|  | 29 | 1 | 10.0 | 10.1 | 48.6 | 72.5 | 93.1 | | |
|  | 30 |  | 10.0 | 66.9 | 44.0 | 10.3 | 38.2 | | |
| COMPARATIVE EXAMPLE | 1 | 6 |  | 58.7 | 29.5 | 22.3 | 21.1 | 80.5 | 38.7 |
|  | 2 | 8 |  | 50.1 | 94.2 | 57.9 | 106.7 | 75.5 | 34.7 | 38.9 |

| | | | FILM MATERIAL/THICKNESS (UNIT: nm) | | | | | | | |
|---|---|---|---|---|---|---|---|---|---|---|
| | | NO. OF LAYERS (m) | LAYER 8 $SiO_2$ | LAYER 9 $TiO_2$ | LAYER 10 $SiO_2$ | LAYER 11 $TiO_2$ | LAYER 12 $SiO_2$ | LAYER 13 $TiO_2$ | LAYER 14 $SiO_2$ | HYDROPHILIC FILM $SiO_2$ |
| EXAMPLE | 21 | 10 | 89.8 | 84.0 | 31.6 | | | | | |
| | 22 |  | 42.3 | 34.9 | 65.1 | | | | | |
| | 23 | 12 | 73.4 | 84.1 | 99.9 | 88.0 | 99.5 | | | |
| | 24 |  | 50.2 | 59.7 | 71.9 | 42.3 | 92.8 | | | |
| | 25 | 14 | 111.0 | 71.0 | 104.0 | 78.1 | 117.9 | 87.4 | 141.6 | |
| | 26 |  | 83.9 | 46.6 | 86.1 | 44.0 | 76.3 | 36.0 | 36.3 | |
| | 27 | 3 | | | | | | | | |
| | 28 |  | | | | | | | | |
| | 29 | 1 | | | | | | | | |
| | 30 |  | | | | | | | | |
| COMPARATIVE EXAMPLE | 1 | 6 | | | | | | | | |
| | 2 | 8 | 88.2 | 40.7 | | | | | | |

<SUBSTRATE SIDE>← →<OUTSIDE>

In Tables 1 and 2, 'No. of layers m' indicates the total number of high-refractive-index transparent films 4 and low-refractive-index transparent films 5, and 'film material/thickness (nm)' shows the order in which the films were deposited, and the material and thickness of each film.

Figure 4A:
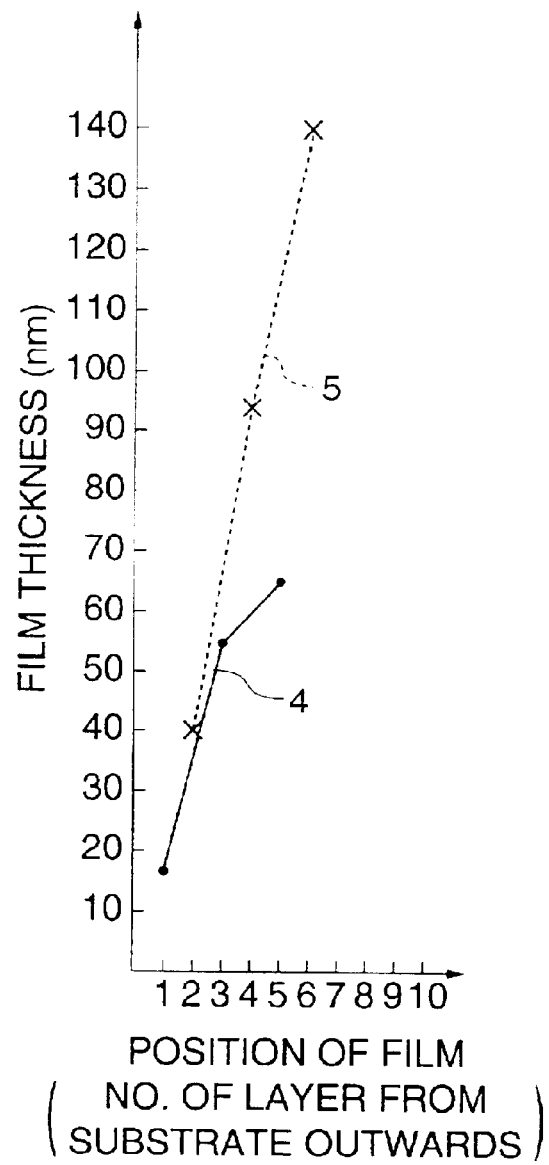
FIGS. 4A and 4B are graphs showing how the film thicknesses of the high-refractive-index transparent films 4 and the low-refractive-index transparent films 5 increase progressively with distance from the transparent substrate 2 in Examples shown in Table 1; specifically.
Figure 4B:
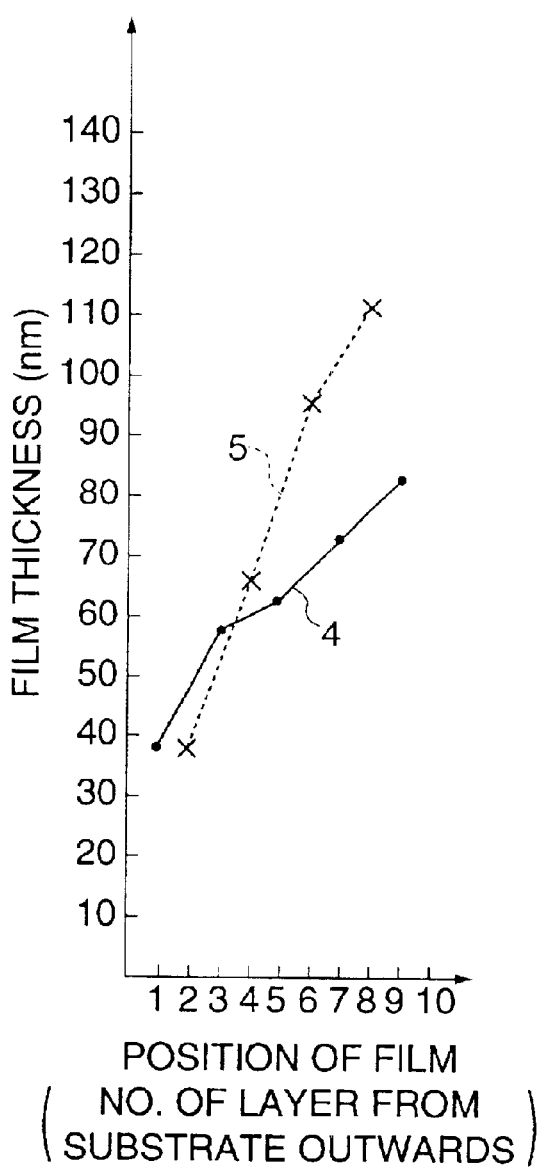
Figure 5A:
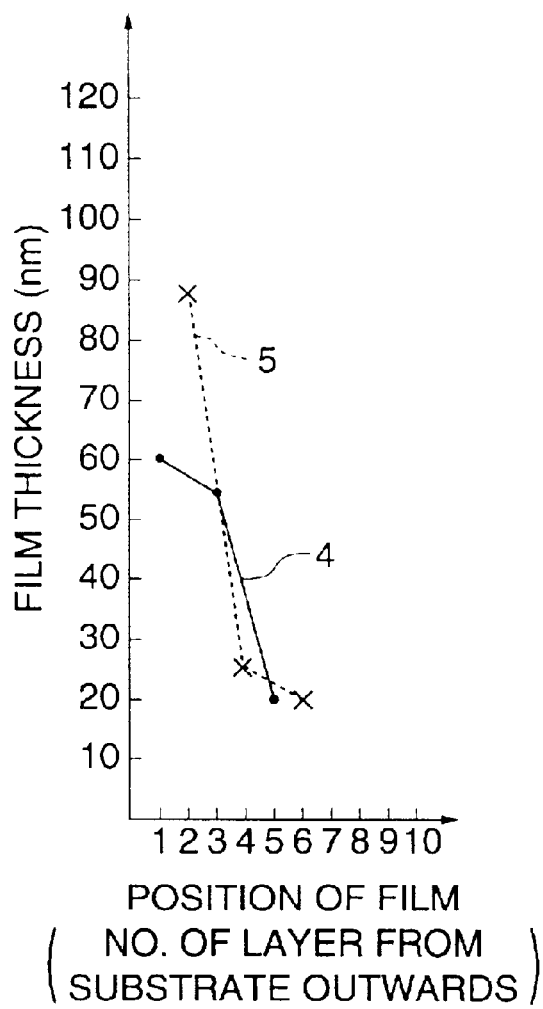
FIGS. 5A and 5B are graphs showing how the film thicknesses of the high-refractive-index transparent films 4 and the low-refractive-index transparent films 5 decrease progressively with distance from the transparent substrate 2 in Examples shown in Table 1; specifically.
Figure 5B:
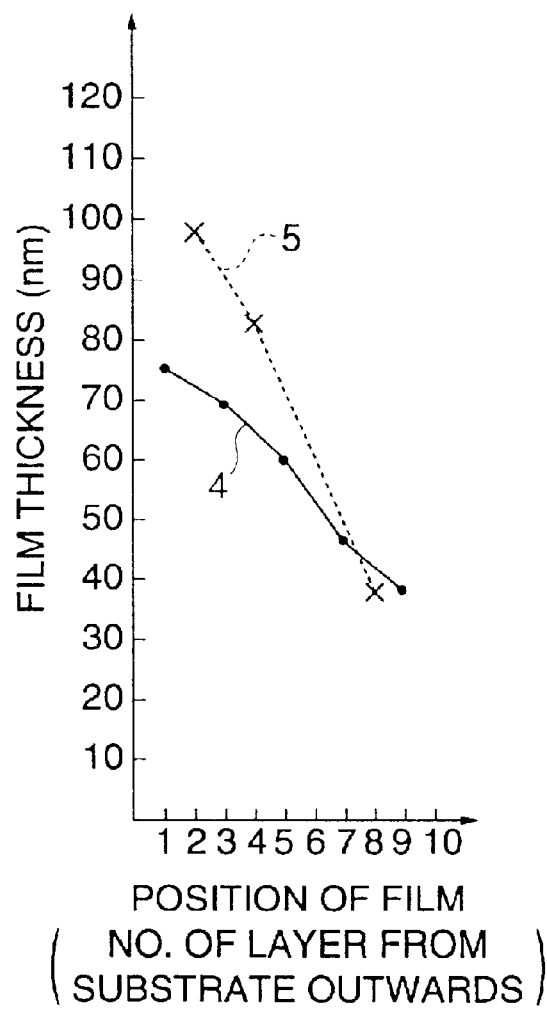

In Examples 1, 3, 5, 7, 9, 11, 13, 15, 18, 19, 20 and 29 shown in Tables 1 and 2, the high-refractive-index transparent films 4 and the low-refractive-index transparent films 5 were both arranged such that the film thicknesses thereof increase progressively with distance from the transparent substrate 2. In particular, the way in which these film thicknesses change is shown in FIG. 4A for Example 5 and FIG. 4B for Example 13. On the other hand, in Examples 2, 4, 6, 8, 10, 12, 14, 16, 17 and 30 shown in Tables 1 and 2, the high-refractive-index transparent films 4 and the low-refractive-index transparent films 5 were both arranged such that the film thicknesses thereof decrease progressively with distance from the transparent substrate 2. In particular, the way in which these film thicknesses change is shown in FIG. 5A for Example 6 and FIG. 5B for Example 14.

Moreover, in Examples 21, 23, 25 and 27, the high-refractive-index transparent films 4 only were arranged such that the film thickness thereof increases progressively with distance from the transparent substrate 2, and conversely, in Examples 22, 24, 26 and 28, the high-refractive-index transparent films 4 only were arranged such that the film thickness thereof decreases progressively with distance from the transparent substrate 2.

In Comparative Examples 1 and 2 in Table 2, the high-refractive-index transparent films 4 and low-refractive-index transparent films 5 were built up without controlling the film thicknesses thereof in any particular way. The way in which these film thicknesses change is shown in FIGS. 6A and 6B.

In Examples 17 and 18, a base film 3a having $SiO_2$ as the principal component was deposited between the transparent rugged scattering layer 15 and the multilayer dielectric film reflective mirror 6. In Examples 1, 13 to 16, 19, 20, 27 and 28, a $TiO_2$ film was built up as the outermost layer of the multilayer dielectric film reflective mirror 6. Out of these, in Examples 19 and 20, a thin $SiO_2$ film was built up on top of the outermost $TiO_2$ film. In each of the Examples, the $TiO_2$ film furthest from the transparent substrate 2 acts as a photocatalytic film having photocatalytic activity. Moreover, in Examples 19 and 20, the $SiO_2$ film built up as the outermost layer acts as a hydrophilic thin film.

For each of the above samples, visible light was irradiated from one surface, and the optical transmittance (%) and the light reflectance (%) were measured for this visible light at wavelengths corresponding to the red, green and blue components. The measurement results are shown in Tables 3 and 4.

TABLE 3

| | | NO. OF LAYERS (m) | OPTICAL REFLECTANCE (%) | | | | OPTICAL TRANSMITTANCE (%) | | | |
|---|---|---|---|---|---|---|---|---|---|---|
| | | | R (640 nm) | G (530 nm) | B (460 nm) | ΔR | R (640 nm) | G (530 nm) | B (460 nm) | ΔT |
| EXAMPLE | 1 | 5 | 31.3 | 28.8 | 32.9 | 4.1 | 66.7 | 70.4 | 66.1 | 4.3 |
| | 2 | 6 | 30.6 | 28.7 | 31.3 | 2.6 | 67.4 | 70.5 | 67.7 | 3.1 |
| | 3 | | 37.8 | 36.8 | 39.5 | 2.7 | 60.4 | 62.4 | 58.3 | 4.1 |
| | 4 | | 38.6 | 37.5 | 40.1 | 2.6 | 59.8 | 61.6 | 57.5 | 4.1 |
| | 5 | | 46.7 | 46.1 | 47.6 | 1.5 | 51.4 | 53.0 | 50.0 | 3.0 |
| | 6 | | 46.1 | 45.9 | 46.9 | 1.0 | 51.9 | 53.1 | 50.2 | 2.9 |

TABLE 3-continued

| NO. OF LAYERS (m) | OPTICAL REFLECTANCE (%) | | | | OPTICAL TRANSMITTANCE (%) | | | |
|---|---|---|---|---|---|---|---|---|
| | R (640 nm) | G (530 nm) | B (460 nm) | ΔR | R (640 nm) | G (530 nm) | B (460 nm) | ΔT |
| 7  10 | 75.0 | 75.9 | 75.4 | 0.9 | 25.6 | 25.7 | 21.3 | 4.4 |
| 8     | 76.2 | 76.6 | 74.1 | 2.5 | 21.8 | 22.6 | 24.9 | 3.1 |
| 9  12 | 75.4 | 75.2 | 76.5 | 1.3 | 22.6 | 23.9 | 24.3 | 1.7 |
| 10    | 72.3 | 73.3 | 71.2 | 2.1 | 25.7 | 25.8 | 27.4 | 1.7 |
| 11 14 | 84.8 | 82.3 | 83.6 | 2.5 | 13.8 | 16.9 | 15.8 | 3.1 |
| 12  9 | 84.6 | 82.7 | 84.7 | 2.0 | 12.7 | 16.1 | 14.6 | 3.4 |
| 13    | 73.7 | 74.1 | 77.8 | 4.1 | 24.3 | 25.1 | 21.2 | 3.9 |
| 14    | 76.3 | 76.7 | 73.8 | 2.9 | 21.8 | 22.6 | 25.2 | 3.4 |
| 15    | 79.2 | 79.3 | 78.3 | 0.9 | 18.9 | 20.0 | 20.8 | 1.9 |
| 16    | 78.4 | 79.5 | 80.1 | 1.7 | 19.7 | 19.8 | 19.0 | 0.8 |
| 17  6 | 28.9 | 26.7 | 30.5 | 3.8 | 69.2 | 72.5 | 68.7 | 3.8 |
| 18 10 | 73.9 | 72.3 | 76.1 | 3.8 | 24.1 | 26.9 | 22.9 | 4.0 |
| 19  9 | 73.8 | 74.2 | 77.9 | 4.1 | 24.3 | 25.0 | 21.2 | 3.8 |
| 20    | 73.8 | 74.2 | 78.0 | 3.9 | 24.2 | 25.0 | 21.2 | 3.9 |

TABLE 4

| | NO. OF LAYERS (m) | OPTICAL REFLECTANCE (%) | | | | OPTICAL TRANSMITTANCE (%) | | | |
|---|---|---|---|---|---|---|---|---|---|
| | | R (640 nm) | G (530 nm) | B (460 nm) | ΔR | R (640 nm) | G (530 nm) | B (460 nm) | ΔT |
| EXAMPLE 21 | 10 | 74.0 | 74.3 | 72.3 | 2.0 | 24.3 | 24.9 | 26.4 | 2.1 |
| 22 |   | 75.3 | 75.4 | 75.2 | 0.2 | 23.7 | 24.0 | 23.0 | 1.0 |
| 23 | 12 | 73.9 | 76.9 | 77.2 | 3.3 | 24.2 | 22.2 | 20.7 | 3.5 |
| 24 |   | 72.1 | 75.9 | 75.7 | 3.8 | 25.9 | 23.2 | 23.0 | 3.5 |
| 25 | 14 | 84.8 | 82.3 | 83.6 | 2.5 | 15.0 | 17.0 | 15.3 | 2.0 |
| 26 |   | 82.5 | 81.8 | 80.3 | 2.2 | 15.5 | 16.5 | 15.3 | 1.2 |
| 27 | 3 | 16.9 | 20.1 | 22.6 | 5.7 | 81.1 | 79.1 | 76.3 | 4.8 |
| 28 |   | 18.3 | 19.1 | 20.2 | 1.9 | 79.7 | 80.0 | 78.6 | 1.4 |
| 29 | 4 | 18.1 | 18.2 | 21.0 | 2.9 | 80.0 | 81.0 | 79.9 | 1.1 |
| 30 |   | 19.0 | 19.3 | 19.8 | 0.8 | 79.0 | 79.9 | 79.0 | 0.9 |
| COMPARATIVE EXAMPLE 1 | 6 | 41.4 | 15.9 | 45.0 | 29.1 | 56.7 | 83.3 | 54.0 | 29.7 |
| 2 | 8 | 50.0 | 93.0 | 68.3 | 43.0 | 48.1 | 6.2 | 30.7 | 41.9 |

In Tables 3 and 4, the optical transmittance (%) indicates the percentage of the visible light that was transmitted through the sample at wavelengths corresponding to the red (R) component (640 nm), the green (G0 component (530 nm) and the blue (B) component (460 nm); the light reflectance (%) indicates the percentage of the visible light that was reflected by the sample at the wavelengths corresponding to the red, green and blue components. ΔR and ΔT indicate the difference between the maximum and minimum values (i.e. the size of the ripples) for the light reflectance and the optical transmittance respectively.

It can be seen from Tables 3 and 4 that by setting the number of high-refractive-index transparent films 4 and low-refractive-index transparent films 5 laminated and the thicknesses thereof as in Tables 1 and 2, for each of Examples 1 to 30 the difference between the maximum and minimum values of the light reflectance is not more than about 10% at the wavelengths corresponding to each of the red, green and blue components of the visible light.

A description of an optical characteristic of the substrate for a reflection type liquid crystal display element of Examples and Comparative Examples of the present invention will now be given with reference to FIGS. 7 to 14.

Figure 7:
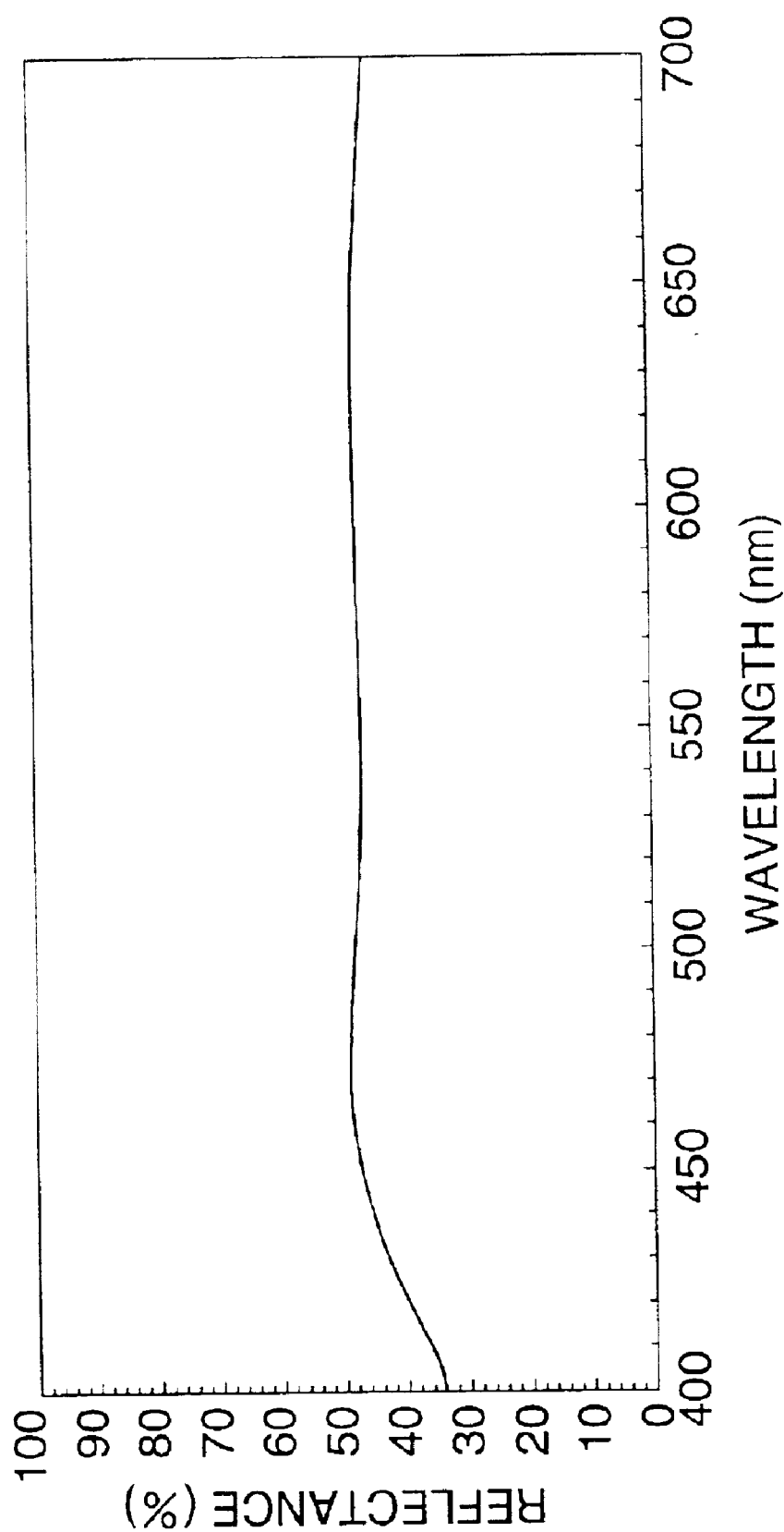
FIG. 7 is a graph showing an optical characteristic for Example 5 shown in Table 1.
Figure 8:
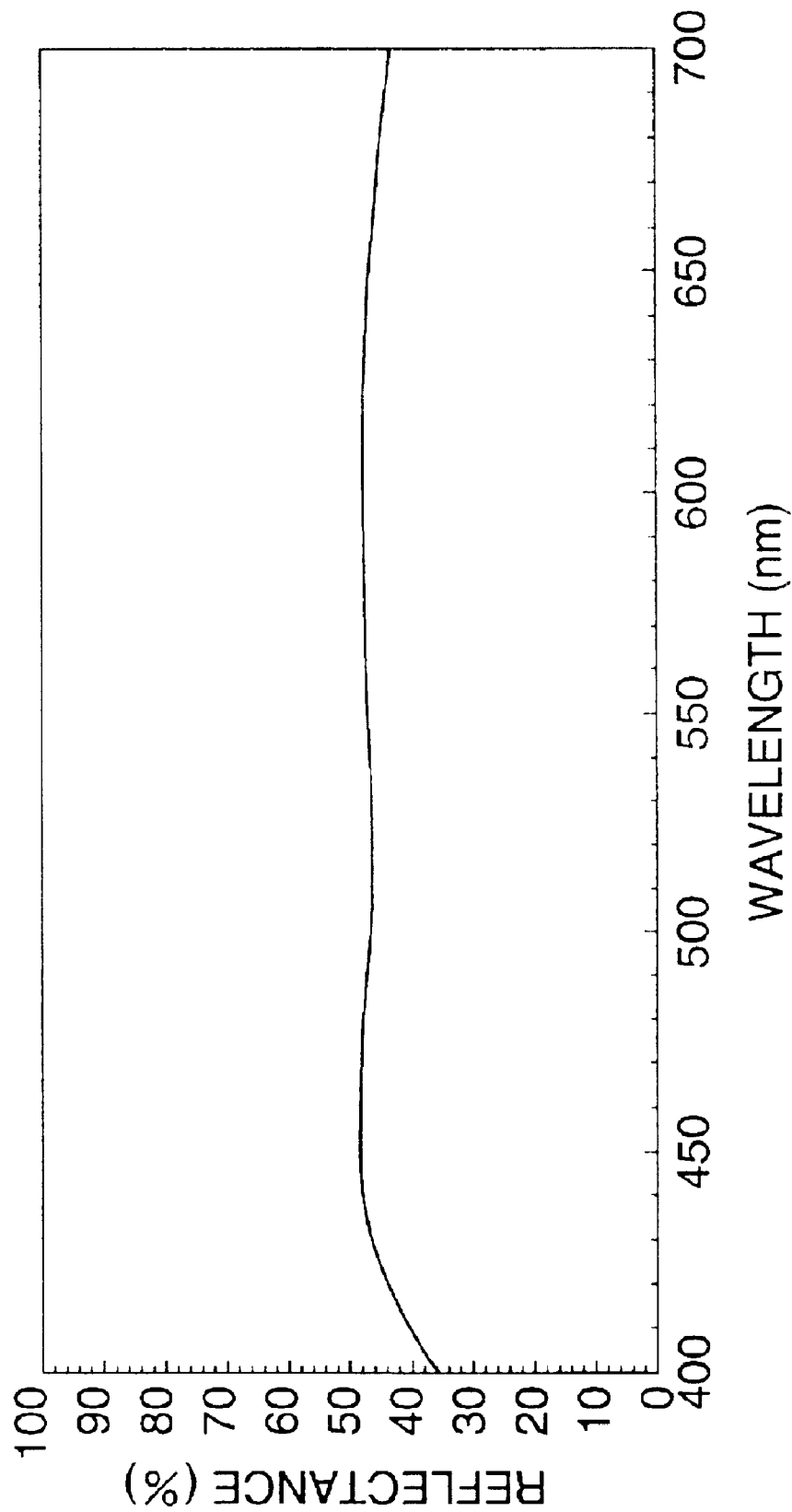
FIG. 8 is a graph showing an optical characteristic for Example 6 shown in Table 1.
Figure 9:
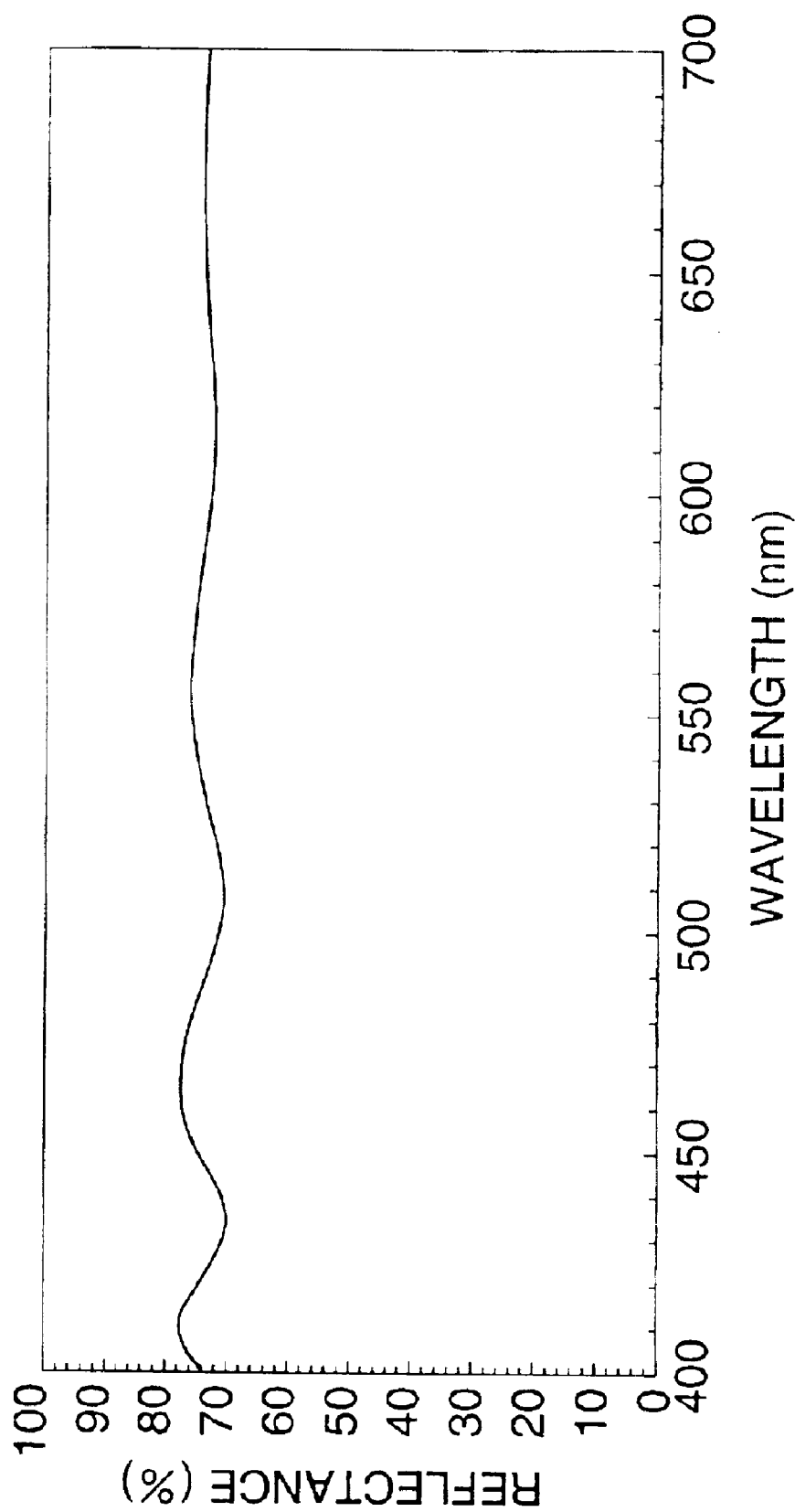
FIG. 9 is a graph showing an optical characteristic for Example 13 shown in Table 1.
Figure 10:
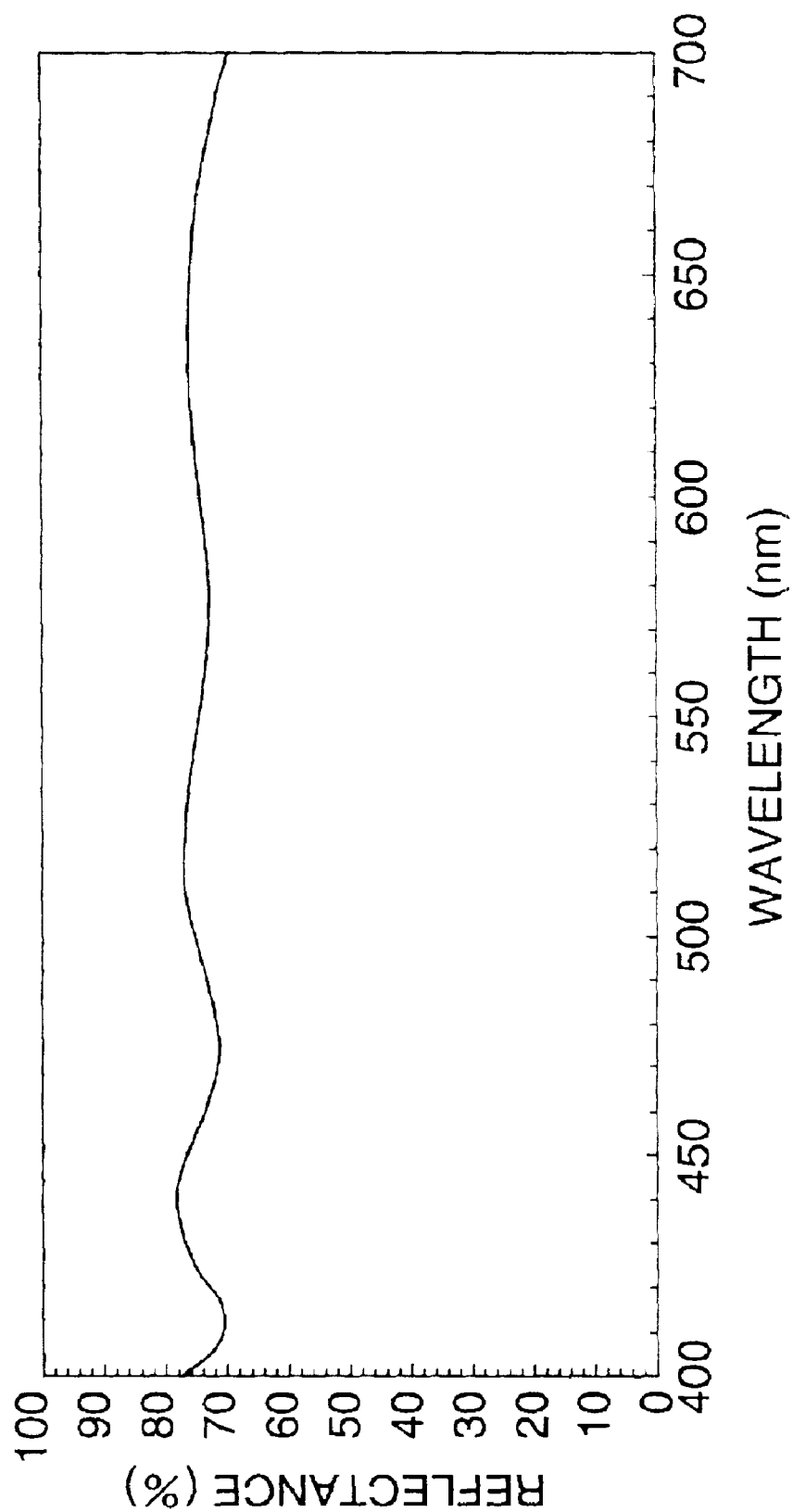
FIG. 10 is a graph showing an optical characteristic for Example 14 shown in Table 1.

FIG. 7 is a graph showing the optical characteristic for Example 5 shown in Table 1. Similarly, FIGS. 8, 9 and 10 are graphs showing the optical characteristic for Examples 6, 13 and 14 respectively shown in Table 1.

Figure 11:
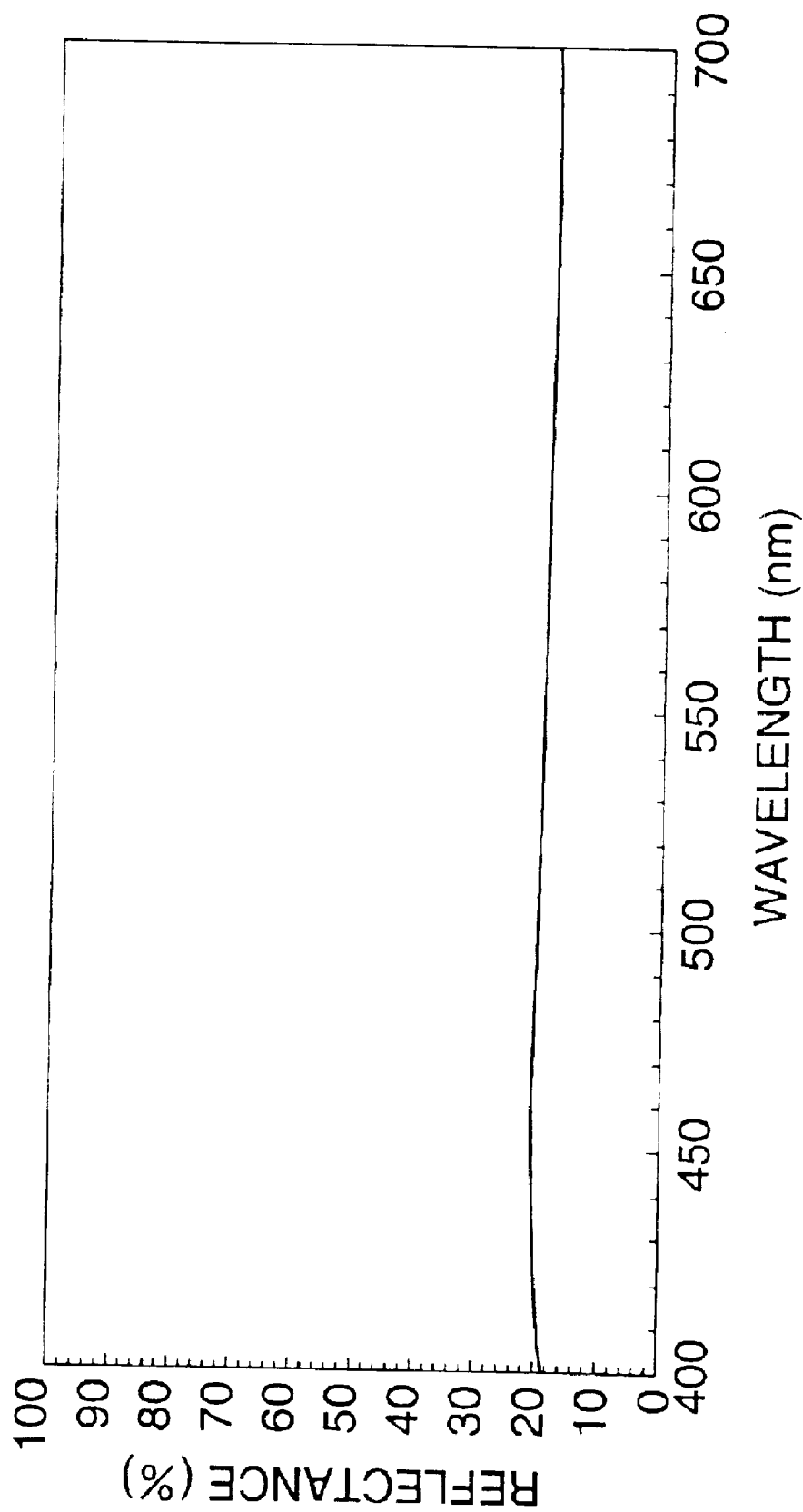
FIG. 11 is a graph showing an optical characteristic for Example 27 shown in Table 2.
Figure 12:
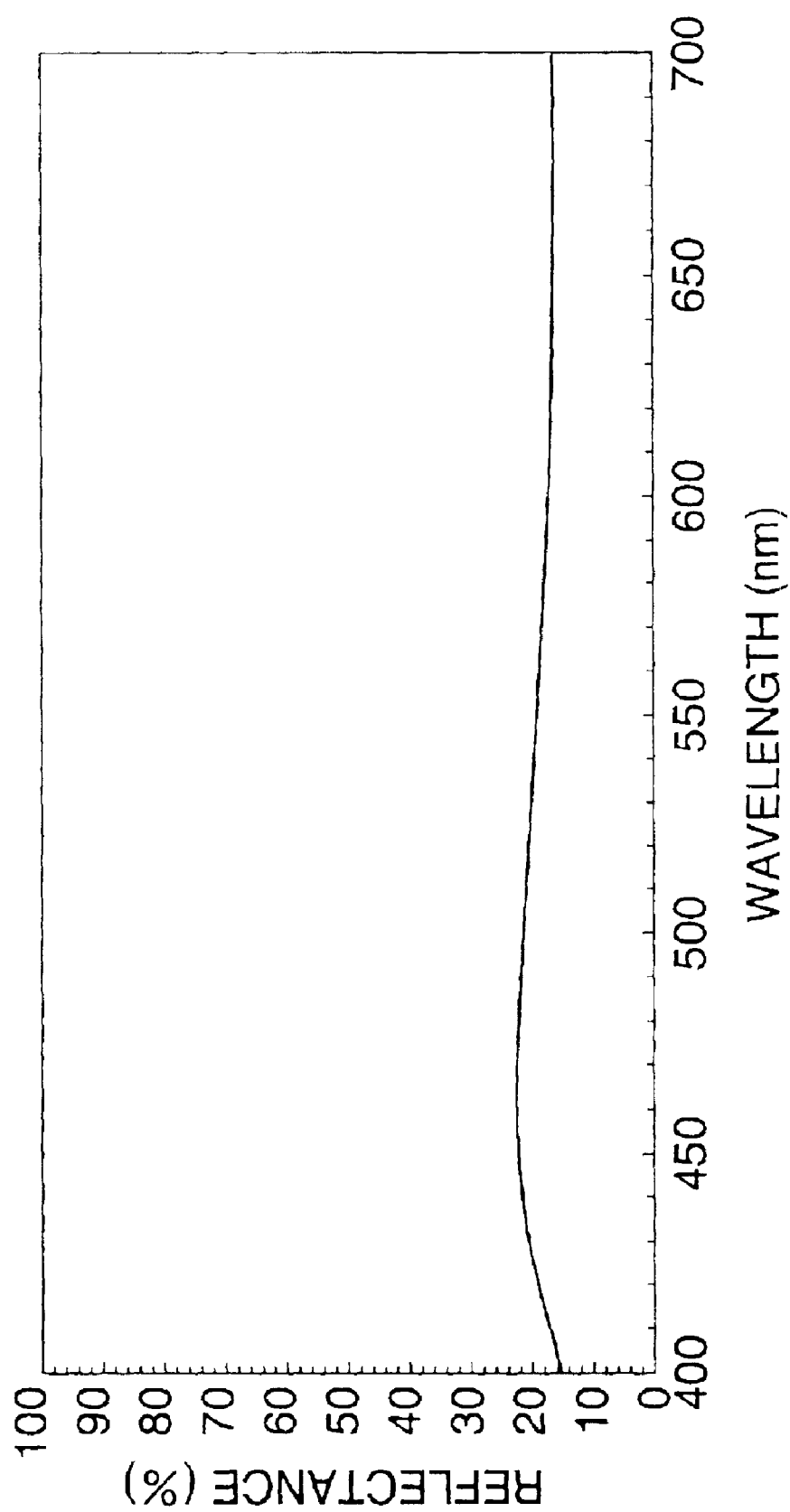
FIG. 12 is a graph showing an optical characteristic for Example 28 shown in Table 2.
Figure 13:
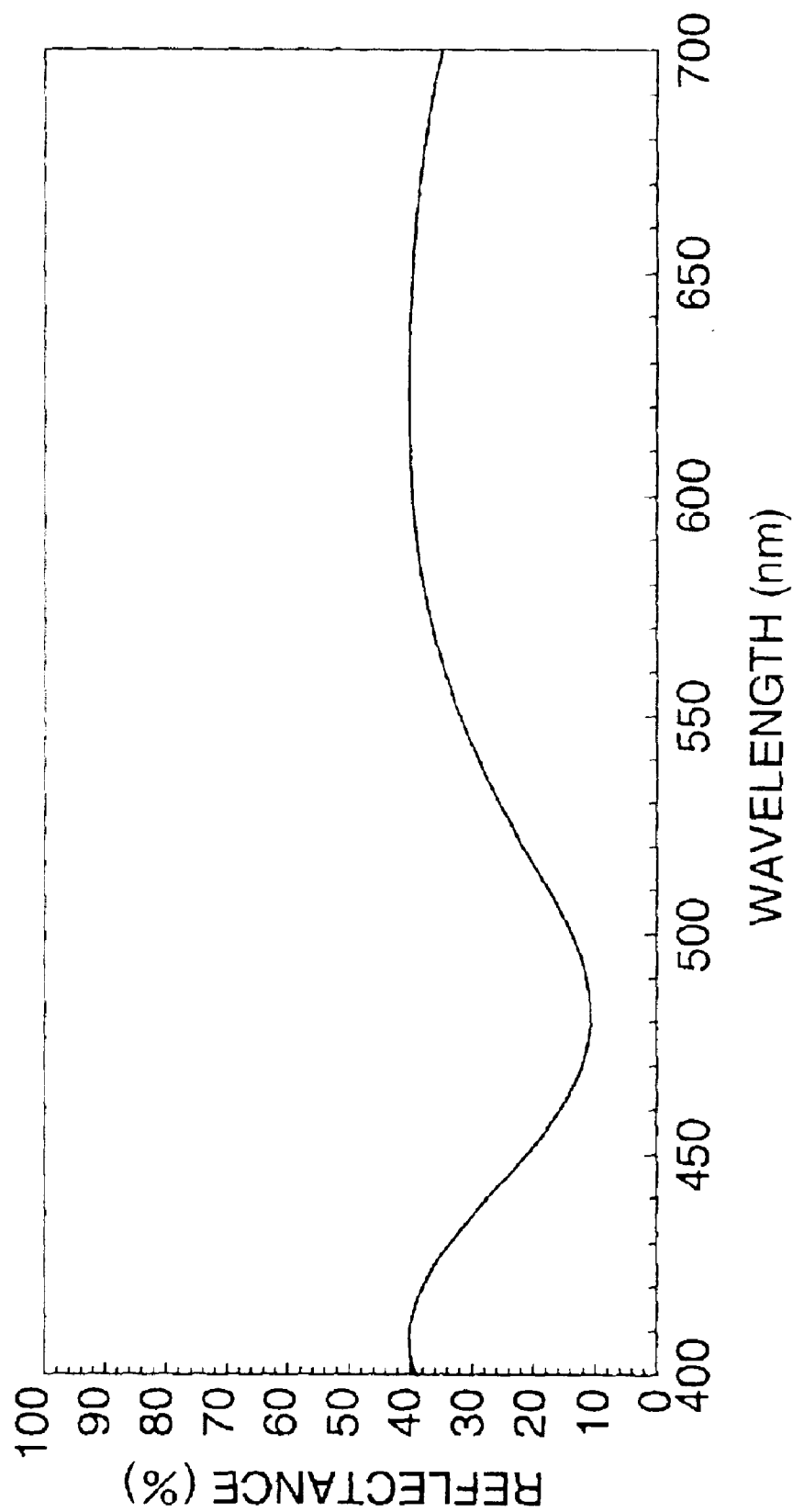
FIG. 13 is a graph showing an optical characteristic for Comparative Example 1 shown in Table 2.
Figure 14:
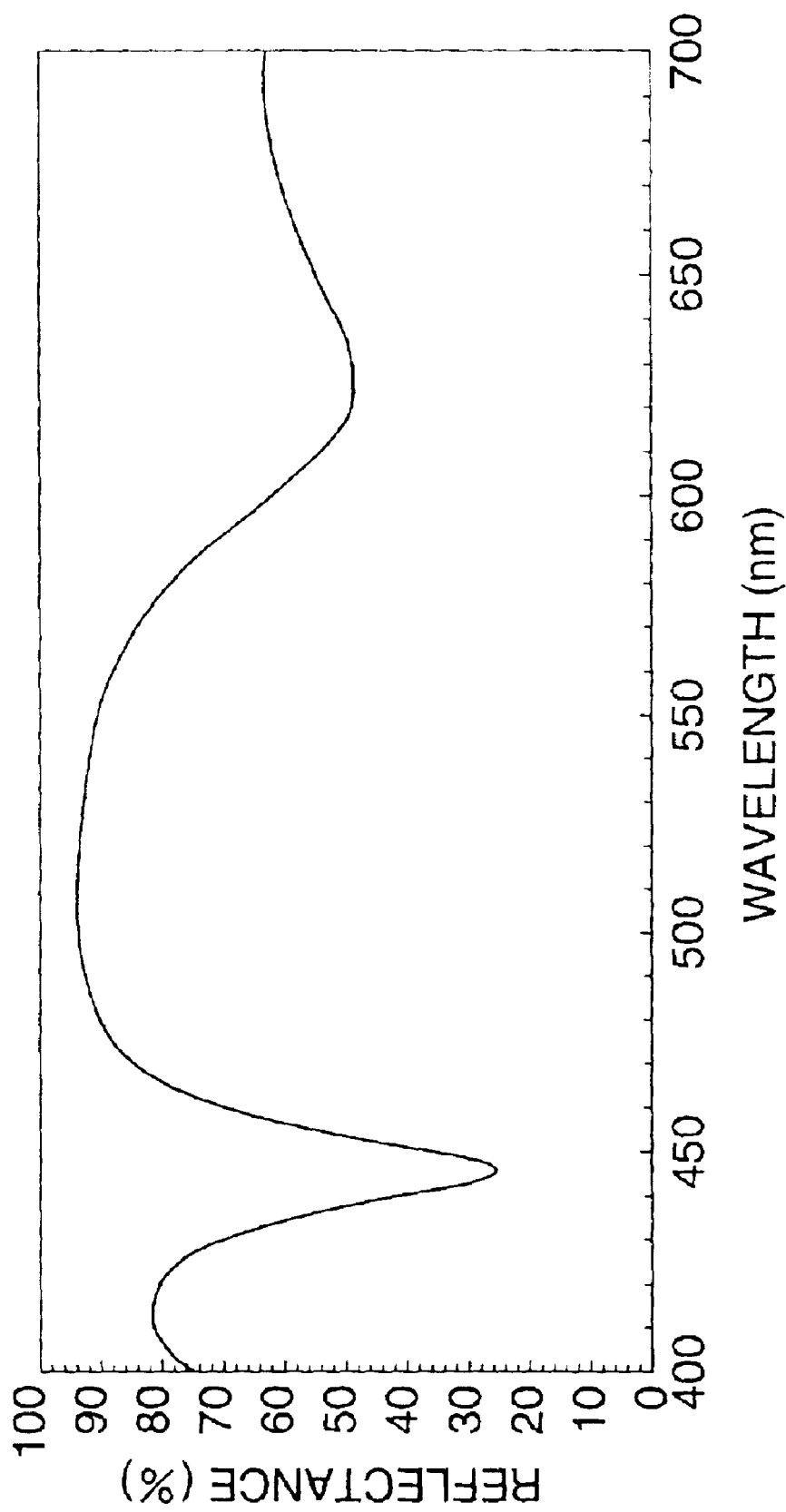
FIG. 14 is a graph showing an optical characteristic for Comparative Example 2 shown in Table 2.

FIG. 11 is a graph showing the optical characteristic for Example 27 shown in Table 2. Similarly, FIGS. 12, 13 and 14 are graphs showing the optical characteristic for Example 28, Comparative Example 1 and Comparative Example 2 respectively shown in Table 2. As the optical characteristic shown in FIGS. 7 to 14, the light reflectance (%) for an angle of incidence of 0° is shown plotted along the ordinate against wavelength (nm) along the abscissa.

As shown in FIGS. 7 to 12, the optical characteristic for each of Examples 5, 6, 13, 14, 27 and 28 is approximately flat, with no significant ripples occurring within the visible region. Conversely, the optical characteristics of Comparative Example 1 (FIG. 13) and Comparative Example 2 (FIG. 14) are not flat, with ripples occurring within the visible region in both cases.

Moving on, measurements were taken with regard to the degree of photocatalytic activity, the hydrophilicity and the adhesion to a color filter 8 for above-mentioned Examples 1, 13 to 16, 19 and 20 and above-mentioned Comparative Example 1. The results are shown in Table 5.

TABLE 5

| | | RESIDUAL TRIOLEIN (%) | CONTACT ANGLE (°) | ADHESION TO COLOR FILTER |
|---|---|---|---|---|
| EXAMPLE | 1 | 46 | 13 | ⊙ |
| | 13 | 39 | 11 | ⊙ |
| | 14 | 54 | 13 | ○ |

TABLE 5-continued

|  | | RESIDUAL TRIOLEIN (%) | CONTACT ANGLE (°) | ADHESION TO COLOR FILTER |
|---|---|---|---|---|
| | 15 | 41 | 11 | ⊙ |
| | 16 | 40 | 14 | ○ |
| | 19 | 42 | 9 | ⊙ |
| | 20 | 48 | 10 | ⊙ |
| COMPARATIVE EXAMPLE | 1 | 97 | 23 | X |

Triolein was applied onto the surface of the outermost layer of the multilayer dielectric film reflective mirror 6 of each of the above samples with the matching layer 14 and the glass faceplate 12 removed, and irradiation was carried out with ultraviolet rays at an intensity of 3 mW/cm$^2$ for 24 hours using a black light. 'Residual triolein' in Table 5 indicates the percentage of the triolein remaining on the surface of the aforementioned outermost layer after the irradiation. The lower this figure, the better the cleaning effect of removing dirt and the like. 'Contact angle' in Table 5 is the contact angle when a drop of water was dropped onto the surface of the outermost layer of the multilayer dielectric film reflective mirror 6 after this surface had been irradiated with ultraviolet rays at an intensity of 3 mW/cm$^2$ for 30 minutes using a black light. The lower this figure, the higher the hydrophilicity.

Regarding the adhesion to the color filter, a color filter 8 was formed on top of the multilayer dielectric film reflective mirror 6 of each of the above samples, and then the adhesion at the interface between the multilayer dielectric film reflective mirror 6 and the color filter 8 was evaluated using a tape test. There were 4 evaluation levels; specifically, '502' indicates no peeling off whatsoever, 'o' indicates that 0 to 1% of the total area peeled off, 'Δ' indicates that 1 to 3% of the total area peeled off, and 'x' indicates that more than 3% of the total area peeled off.

As shown in Table 5, with each of Examples 1 and 13 to 16, for which a photocatalytically active TiO$_2$ film was laminated as the outermost layer, compared with Comparative Example 1, the residual triolein percentage was lower, and good adhesion to the color filter 8 was obtained. Moreover, with Examples 19 and 20, for which an SiO$_2$ film of thickness not more than 10 nm, that is a hydrophilic thin film, was laminated on top of the photocatalytically active TiO$_2$ film, compared with Comparative Example 1, once again the residual triolein percentage and the contact angle were lower, and good adhesion to the color filter 8 was obtained.

What is claimed is:

1. A substrate for a reflection type liquid crystal display element, comprising:
    a transparent substrate; and
    a reflective mirror formed on top of said transparent substrates,
    wherein said reflective mirror comprises a predetermined number of high-refractive-index first transparent films composed of a first dielectric material and low-refractive-index second transparent films composed of a second dielectric material laminated alternately on said transparent substrate, and
    wherein either or both of said first transparent films and said second transparent films are arranged such that a film thickness thereof increases progressively or decreases progressively with distance from said transparent substrate, and a difference between maximum and minimum values of light reflectance is not more than about 10% at wavelengths corresponding to each of red, green, and blue components of visible light so that said reflective mirror is substantially free of ripples in an optical reflection spectrum or optical transmission spectrum across a visible region.

2. A substrate for a reflection type liquid crystal display element as claimed in claim 1, wherein said first transparent films are arranged such that a film thickness thereof increases progressively or decreases progressively with distance from said transparent substrate.

3. A substrate for a reflection type liquid crystal display element as claimed in claim 1, wherein said predetermined number is in a range of 3 to 14.

4. A substrate for a reflection type liquid crystal display element as claimed in claim 1, wherein said predetermined number is 3 or 4.

5. A substrate for a reflection type liquid crystal display element as claimed in claim 1, wherein each of said first transparent films has a refractive index of at least 1.8 at a wavelength of 550 nm, and each of said second transparent films is laminated on top of one of said first transparent films and has a refractive index of not mare than 1.5 at the wavelength of 550 nm.

6. A substrate for a reflection type liquid crystal display element as claimed in claim 1, wherein said first transparent films ala formed of a high-refractive-index material having titanium dioxide as a principal component, and said second transparent films are formed of a low-refractive-index material having silicon dioxide as a principal component.

7. A substrate for a reflection type liquid crystal display element as claimed in claim 1, further comprising a base film having silicon dioxide as a principal component laminated on top of said transparent substrate.

8. A substrate for a reflection type liquid crystal display element as claimed in claim 1, wherein one of said first transparent films furthest from said transparent substrate is a photocatalytically active film having titanium dioxide as a principal component.

9. A substrate for a reflection type liquid crystal display element as claimed in claim 8, further comprising a hydrophilic thin film having silicon dioxide as a principal component laminated on top of said one of said first transparent films.

10. A substrate for a reflection type liquid crystal display element as claimed in claim 7, further comprising a transparent rugged scattering layer laminated between said transparent substrate and said base film.

* * * * *